United States Patent [19]
Dee et al.

[11] Patent Number: 5,997,381
[45] Date of Patent: Dec. 7, 1999

[54] LAPPING SENSOR FOR THIN FILM RECORDING ELEMENTS AND METHOD FOR MANUFACTURING SAME

[75] Inventors: Richard H. Dee, Louisville; Joseph E. Torline, Arvada, both of Colo.

[73] Assignee: Storage Technology Corporation, Louisville, Colo.

[21] Appl. No.: 08/939,937

[22] Filed: Sep. 29, 1997

[51] Int. Cl.$^6$ .................... B24B 49/02; B24B 49/10
[52] U.S. Cl. ........................... 451/5; 29/603.16
[58] Field of Search ............ 451/5, 1; 29/603.16, 29/603.09, 603.15

[56] References Cited

U.S. PATENT DOCUMENTS

| | | |
|---|---|---|
| 4,589,042 | 5/1986 | Anderson . |
| 4,689,877 | 9/1987 | Church ........................................ 451/1 |
| 4,841,625 | 6/1989 | Valstyn . |
| 4,912,883 | 4/1990 | Chang et al. ............................. 451/5 |
| 4,914,868 | 4/1990 | Church et al. ............................ 451/5 |
| 5,023,991 | 6/1991 | Smith ........................................ 451/1 |
| 5,034,838 | 7/1991 | Brock et al. . |
| 5,065,483 | 11/1991 | Zammit ....................................... 451/1 |
| 5,142,768 | 9/1992 | Aboaf et al. . |
| 5,203,119 | 4/1993 | Cole . |
| 5,264,981 | 11/1993 | Campbell et al. . |
| 5,296,993 | 3/1994 | Aboaf et al. . |
| 5,302,461 | 4/1994 | Anthony . |
| 5,597,340 | 1/1997 | Church et al. ............................ 451/5 |
| 5,738,566 | 4/1998 | Li et al. ..................................... 451/5 |

OTHER PUBLICATIONS

F. William Hahn, Jr., *Historical Perspective of Tape Head Contours*, IBM Corporation, Tucson, Arizona.

Richard Dee and James Cates, Designing write heads for high–density tape, Data Storage, pp. 43–48, Oct. 1996.

Brahim Lekmine, Recording Channel and Data Detection in Magnetic Tape Drives, Proceedings, SPIE–The International Society for Optical Engineering, High Density Data Recording and Retrieval Technologies, Oct. 23–24, 1995, vol. 2604, pp. 176–191.

James A. Bain, Recording heads: write heads for high–density magnetic tape, SPIE–The International Society for Optical Engineering, High Density Data Recording and Retrieval Technologies, Oct. 23–24, 1995, vol. 2604, pp. 165–175.

Jim Eaton, Magnetic tape trends and futures, Proceedings, SPIE–The International Society for Optical Engineering, High–Density Data Recording and Retrieval Technologies, Oct. 23–24, 1995, vol. 2604, pp. 146–157.

Richard C. Schneider, Design Methodology for High Density Read Equalization, Proceedings, SPIE–The International Society for Optical Engineering, High Density Data Recording and Retrieval Technologies, Oct. 23–24, 1995, vol. 2604, pp. 200–209.

Priyadarshee et al., Survey of digital transport servo systems, Proceedings, SPIE–The International Society for Optical Engineering, High Density Data Recording and Retrieval Technologies, Oct. 23–24, 1995, vol. 2604, pp. 210–217.

Eric Baugh et al., Head/tape interface, Proceedings, SPIE–The International Society for Optical Engineering, High Density Data Recording and Retrieval Technologies, Oct. 23–24, 1995, vol. 2604, pp. 158–164.

*Primary Examiner*—Robert A. Rose
*Attorney, Agent, or Firm*—Brook & Kushman P.C.

[57] ABSTRACT

A lapping sensor is provided for measuring a throat height of a thin film recording element during a mechanical lapping process. The recording element is fabricated in a photolithographic process and has a zero throat location. The lapping sensor includes a sensor device for generating an output signal indicative of the throat height during the lapping process, and a calibration switch in electrical communication with the sensor device. The switch is fabricated during the same photolithographic process as the recording element and generates an output signal during the lapping process indicative of a low resistance value up to a selected distance from the zero throat location of the recording element, and indicative of a high resistance value thereafter. Transition of the switch output signal from the low resistance value to the high resistance value during the lapping process is used to calibrate the sensor device output signal to the selected distance from the zero throat location of the recording element. A method for manufacturing the lapping sensor is also provided.

6 Claims, 4 Drawing Sheets

LAPPING SENSOR FOR THIN FILM RECORDING ELEMENTS AND METHOD FOR MANUFACTURING SAME

TECHNICAL FIELD

The present invention relates to a lapping sensor for measuring the throat height of a recording element in a thin film tape head, and a method for manufacturing such a sensor.

BACKGROUND ART

As is well known to those of ordinary skill in the art, the performance of a metal pole thin film magnetic head structure is very sensitive to the final throat heights of the individual recording elements that make up that structure. As a result, during manufacture of the magnetic head structure, the throat heights of such recording elements must be carefully controlled. This is particularly critical in tape head structures since such structures include multiple recording elements aligned in a row, all of which must function properly for the tape head to function properly.

Such control of throat heights is generally accomplished using electrical lapping sensors which monitor throat heights during mechanical lapping of the tape head structure. Such sensors are typically fabricated in the tape head structure during the same thin film photolithographic process steps used to fabricate the recording elements themselves. Indeed, in prior art thin film tape head structures, the same metal layer and photolithographic process steps used to define the recording elements are also used to define the lapping sensor element. As a result, the lapping sensor provides a sufficiently accurate measure of the recording element throat heights, especially given the lower tolerances required for the throat heights of such prior art recording elements.

However, in newer thin film tape head structures, such throat height tolerances are tighter, and the electrical lapping sensors cannot be fabricated at the same time as the recording elements. In such structures, during thin film processing, the position of the "zero" throat is set by a baked photoresist "planar" insulating film layer, while the electrical lapping sensor is patterned in a metal film layer. The different photolithographic patterning steps between the lapping sensor and the photoresist planar introduces an alignment error. Depending on equipment and processing, this alignment error could vary anywhere from 0.5 up to 2.0 $\mu$m.

Such newer thin film tape head structures, however, require recording element throat heights controlled to approximately 2.0 to 3.0 $\mu$m, with tolerances of less than 0.5 $\mu$m (10%–20%). As a result, there exists a need for an improved lapping sensor which provides a more accurate measure of the recording element throat heights during the mechanical lapping process. Ideally, such a sensor would still be manufacturable during the same thin film photolithographic process steps used to fabricate the recording elements themselves.

SUMMARY OF THE INVENTION

Accordingly, the principal object of the present invention is to provide an improved lapping sensor for measuring the throat height of a thin film recording element during the lapping process.

According to the present invention, then, a lapping sensor is provided for measuring a throat height of a thin film recording element during a mechanical lapping process. In that regard, the recording element is fabricated in a photo-lithographic process and has a zero throat location. The lapping sensor itself comprises a sensor device for generating an output signal indicative of the throat height during the lapping process, and a calibration switch in electrical communication with the sensor device. The switch is fabricated during the same photolithographic process as the recording element and generates an output signal during the lapping process indicative of a low resistance value up to a selected distance from the zero throat location of the recording element, and indicative of a high resistance value thereafter. Transition of the switch output signal from the low resistance value to the high resistance value during the lapping process is used to calibrate the sensor device output signal to the selected distance from the zero throat location of the recording element.

According to the present invention, a method is also provided for manufacturing a lapping sensor for measuring a throat height of a thin film recording element during a mechanical lapping process. Once again, the recording element is fabricated in a photolithographic process and has a zero throat location. The method itself comprises providing a sensor device for generating an output signal indicative of the throat height during the lapping process, and fabricating a calibration switch in electrical communication with the sensor device during the same photolithographic process as the recording element. The switch generates an output signal during the lapping process indicative of a low resistance value up to a selected distance from the zero throat location of the recording element, and indicative of a high resistance value thereafter. Transition of the switch output signal from the low resistance value to the high resistance value during the lapping process is used to calibrate the sensor device output signal to the selected distance from the zero throat location of the recording element.

These and other objects, features and advantages will be readily apparent upon consideration of the following detailed description in conjunction with the accompanying drawings.

DETAILED DESCRIPTION OF THE INVENTION

Figure 1:
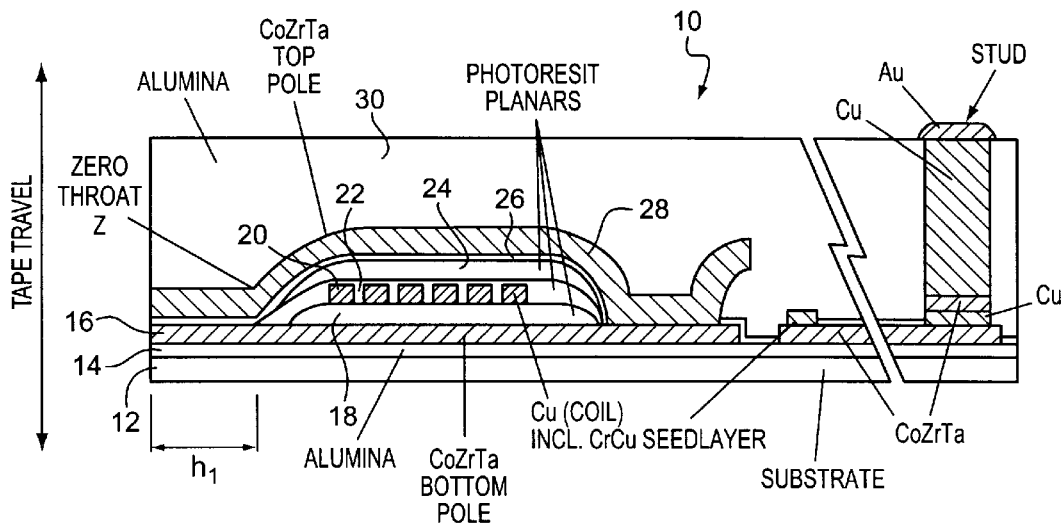
FIG. 1 is a cross-sectional view of a thin film recording head for use with the improved lapping sensor of the present invention.
Figure 2:
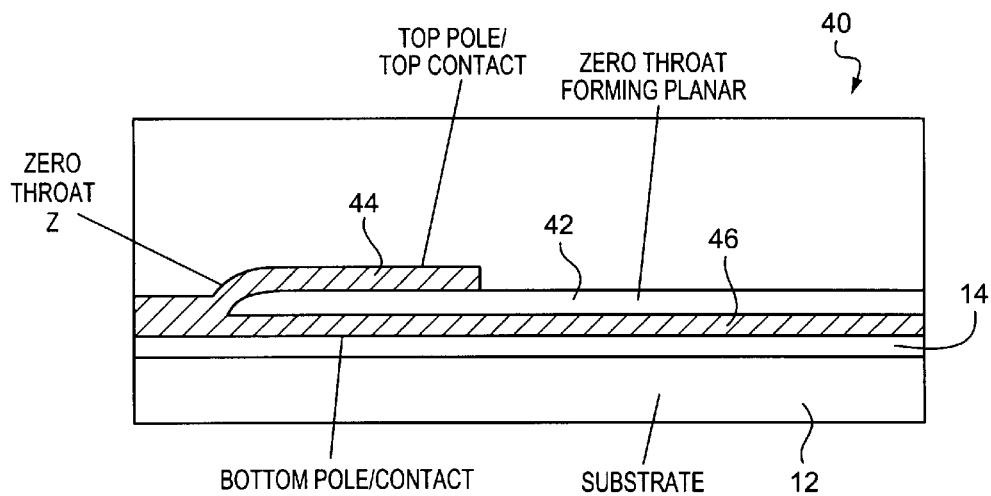
FIG. 2 is a cross-sectional view of the calibration switch element of the preferred embodiment of the improved lapping sensor of the present invention.
Figure 3:
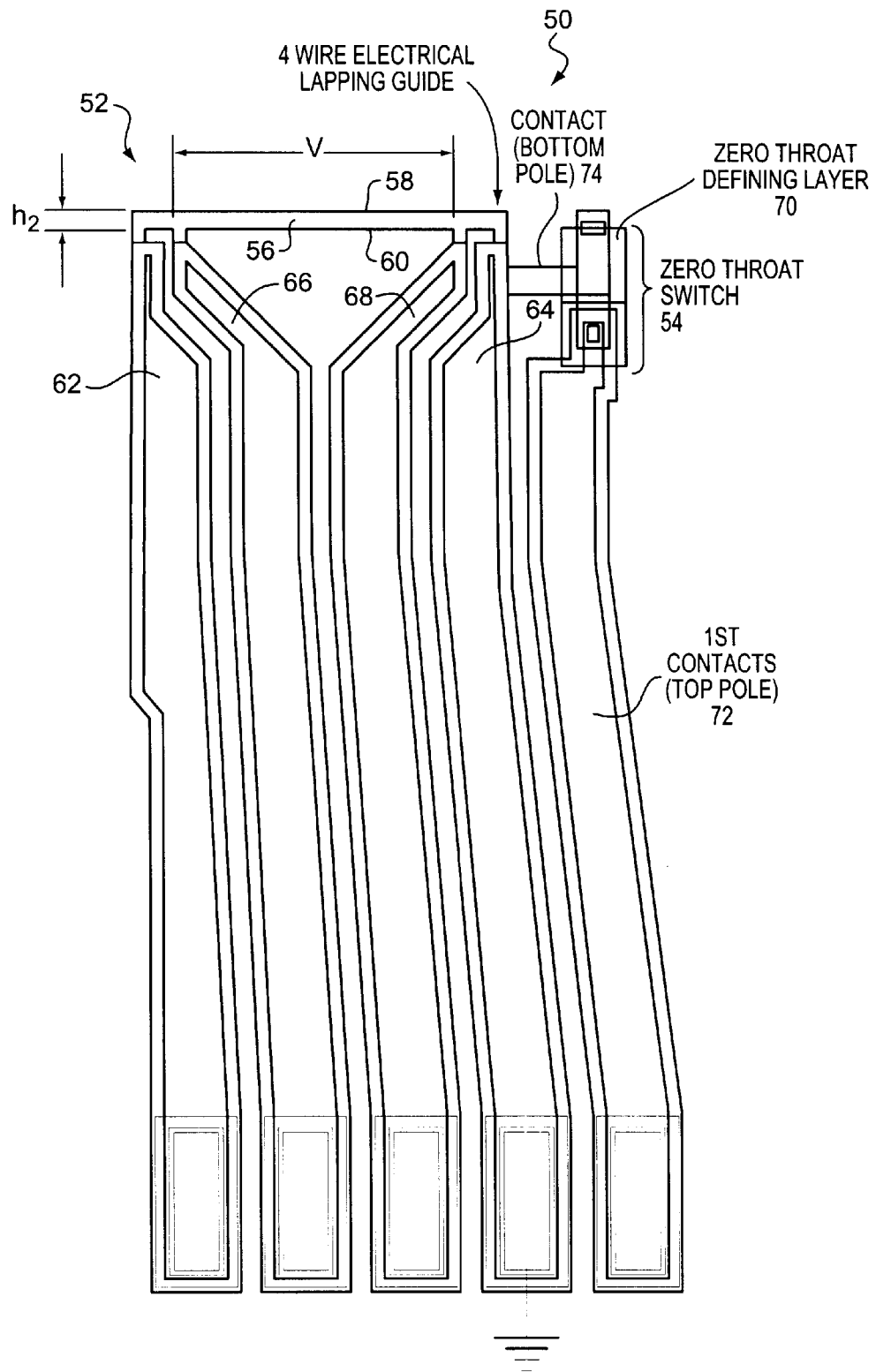
FIG. 3 is a plan view of the preferred embodiment of the improved lapping sensor of the present invention.

With reference to FIGS. 1–3, the preferred embodiment of the present invention will now be described in detail. In that regard, FIG. 1 shows a cross-sectional view of a thin film recording head, denoted generally by reference numeral 10, for use with the improved lapping sensor of the present invention. As seen therein, recording element (10) is a write element comprising a substrate (12) such as aluminum-titanium-carbide (AlTiC) having an insulating layer (14) such as aluminum oxide deposited thereon.

Recording element (10) further comprises a magnetic "bottom" pole (16) deposited on insulating layer (14). Magnetic pole (16) is preferably fabricated from a cobalt-zirconium-tantalum (CZT) alloy, but may also be fabricated from any number of materials, such as ferrite materials, nickel-iron alloys including permalloy, or iron based alloys and compounds.

A "planar" (18) is then deposited over magnetic pole (16). Planar (18) is a photoresist material which is processed and baked to create a hard, smooth, planar insulating surface at the location shown. A conductive material such as copper is then electroplated on planar (18) to create inductive coils (20) of recording element (10). Once again, planar (18) and coils (20) are fabricated according to known photolithographic processes.

To smooth the topography over coils (20), additional planars (22, 24) are next deposited thereover. Planars (22, 24) are again a photoresist material which is processed to create openings, or vias, to magnetic pole (16). An insulating material, preferably aluminum oxide, is then deposited on magnetic pole (16) and planar (24) to create a magnetic gap (26). Magnetic gap (26) is also processed to create a via to magnetic pole (16). It should be noted that planars (22, 24) and magnetic gap (26) are also fabricated according to photolithographic processes well known in the art.

Thereafter, a magnetic material similar to that used to fabricate magnetic pole (16) is deposited on magnetic gap (26) and magnetic pole (16) to create magnetic "top" pole (28). In that regard, the magnetic material fills the vias to magnetic pole (16) such that magnetic poles (16, 28) define a magnetic yoke. As is well known in the art, a magnetic field is created in the magnetic yoke defined by magnetic poles (16, 28) by providing a current to coils (22) during operation of recording element (10).

Finally, to complete recording element (10), additional material (30) is deposited over magnetic pole (28). This material (30) is preferably aluminum oxide, although other insulating materials may also be used. Once again, magnetic pole (28) and covering material (30) are fabricated according to process steps well known in the art.

The write head of recording element (10) has a throat height (h1) and a "zero" throat location (z) formed by planar (22). Known mechanical trimming and lapping techniques are used to set the final value of throat height (h1) and to prepare the tape interface at that end of recording element (10) where magnetic poles (16, 28) are separated by magnetic gap (26). In that regard, the direction of travel of a magnetic tape across that interface is denoted by the arrows labeled "TAPE TRAVEL".

As previously described, the performance of recording element (10) is very sensitive to the final throat height (h1). During thin film processing, the zero throat location (z) is set by planar (22). Electrical lapping sensors (not shown) to measure the throat height (h1) during the lapping process are patterned in a metal film layer (e.g., in a thin seed layer for a plating step). Thus, the photolithographic patterning between the base of the lapping sensor and the edge of planar (22) causes an alignment error therebetween. Depending on equipment and processing, this alignment error could vary anywhere from 0.5 to up to 2 $\mu$m.

However, as also previously described, the throat height (h1) needs to be controlled to <0.5 $\mu$m. The solution to this problem is to manufacture a "fake" thin film head structure next to a lapping sensor for measuring the throat height (h1) of recording element (10).

In that regard, referring now to FIG. 2, a cross-sectional view of the calibration "switch" element of the improved lapping sensor of the present invention is shown, denoted generally by reference numeral (40). As seen therein, switch (40) comprises a single insulating planar layer (42) interposed between two metal layers (44, 46) which act as electrical contacts.

Referring now to FIGS. 1 and 2, insulating layer (42) is preferably planar (22) from recording element (10), while metal layers (44, 46) are preferably the top and bottom poles (28, 16), respectively. Thus, switch (40) is formed in the same manner and at the same time and photolithographic steps as thin film recording element (10). In that regard, the insulating gap layer (26) that separates the two poles (16, 28) in recording element (10) is etched away for switch (40). In that same regard, metal layer (46) is deposited on insulating layer (14) of recording element (10), which is itself deposited on substrate (12).

Referring now to FIG. 3, a plan view of the preferred embodiment of the improved lapping sensor of the present invention is shown, denoted generally by reference numeral (50). As seen therein, lapping sensor (50) comprises a continuous readout four wire lapping guide (52), in combination with a calibration switch (54) of the type described above with respect to FIG. 2. In that regard, while a four wire lapping guide (52) is preferred, a two wire lapping guide or a cascade of switches may also be used, both of which are well known in the art.

Lapping guide (52) includes a sensor element (56) having top and bottom ends (58, 60) defining a sensor element height (h2). During the lapping process, sensor element height (h2) is reduced from top end (58) toward bottom end (60). Sensor element (56) has a resistive value that increases as sensor element height (h2) decreases. Thus, given a constant current supplied to sensor element (56) via electrical leads (62, 64), the voltage across electrical leads (66, 68) increases as the resistance of sensor element (56) increases. In that regard, a four wire lapping guide (52) of the type shown in FIG. 3 is preferred because it eliminates readout error as compared to a two wire lapping guide. More specifically, the resistance change described above is attributable solely to sensor element (56), rather than to any of the electrical leads provided to sensor element (56).

Still referring to FIG. 3, calibration switch (54) includes a zero throat defining layer (70), and first and second electrical contacts (72, 74). Once again, first contact (72) is fabricated from the same material layer used to fabricate a recording element top pole, and second contact (74) is fabricated from the same material layer used to fabricate a recording element bottom pole. As seen in FIG. 3, second electrical contact (74) of calibration switch (54) is provided in electrical communication with lapping guide (52) via shared lead (64).

Referring now to FIGS. 1–3, bottom end (60) of sensor element (56) of lapping guide (52) is preferably set back from the zero throat location (z) by 5 $\mu$m, which is well within the tolerances for fabrication of lapping sensor (50) during different photolithographic steps from those used to fabricate recording element (10). Similarly, the edge of insulating planar (42) of calibration switch (40) is preferably set up from the zero throat location (z) of recording element (10) by 5 $\mu$m. This allows time and material for the lapping process to catch up with any errors indicated when calibration switch (40) opens, as described below.

With continuing reference to FIGS. 1–3, during lapping, throat height (h1) is continuously monitored using lapping guide (52). When the material of magnetic poles (16, 28) and gap (26) is removed down to where the edge of insulating planar (42) of switch (40) is located, metal contacts (44, 46) are opened and the resistance of the circuit formed thereby goes from low to high. At this instant, the dimension output from lapping guide (52) is reset to read 5 μm, the exact location of the edge of insulating planar (42) of switch (40) relative to the zero throat location (z) of recording element (10). The lapping process then continues until the specified throat height (h1), preferably 2.0 μm, is met. The algorithm resets the readout by including an offset indicated by the switch open instant. The sensor configuration continues as normal to maintain accuracy.

In that regard, according to the present invention, digital calibration of electronic lapping guides is undertaken according to the formula:

$$(R_I * H_I / R_C) + C = H_C$$

where: $R_I$=initial resistance of the lapping guide;
$H_I$=initial height of the lapping guide;
$R_C$=current resistance of the lapping guide;
$H_C$=current height of the lapping guide; and
C=calibration constant.

Calibration constant (C) is calculated according to the following:
switch closed: C=0; and
switch open: C=Calpt. $-H_{SW}$
where: Calpt.=known digital switch location; and
$H_{SW}$=throat height when switch opens.

Figures 4A, 4B:
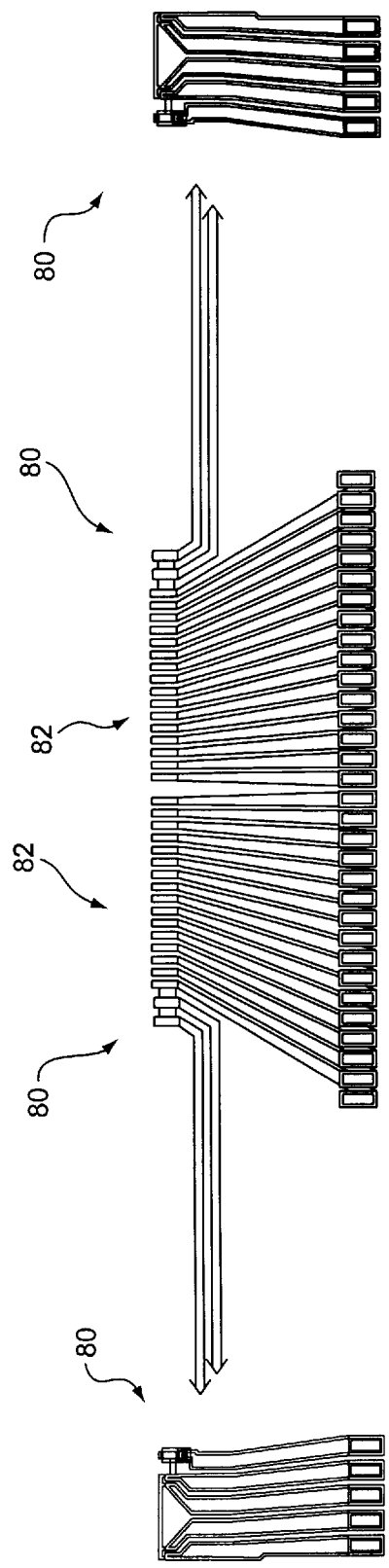
FIGS. 4a and 4b are side views of the improved lapping sensor of the present invention in alternative tape head assembly embodiments.

Referring next to FIGS. 4a and 4b, side views of the improved lapping sensor of the present invention in alternative tape head structure embodiments are shown. In that regard, it should be noted that lapping sensors (80) are preferably fabricated at one or both ends of a row of multiple recording elements (82) forming a tape head structure. As previously described, each lapping sensor (80) may have a "fake" thin film head structure (which functions as a switch) in close proximity thereto (FIG. 4a). However, this "fake" thin film head structure may alternatively be located in close proximity to the actual recording devices (82) (FIG. 4b). In the embodiment of FIG. 4b, all the planars and coil of an actual recording element may be used to better simulate the device topography. This may further improve the accuracy of the switch opening portion of lapping sensor (80) by eliminating any additional offset due to the spacing between recording elements (82) and the lapping sensor (80) for a larger module with a centrally grouped set of recording devices (82).

Two such tape head structures are preferably positioned and/or fabricated side by side so that the lapping process may be performed on a pair of heads. As a result, lapping sensors (80) are set in three or four positions across the pair of heads, one at each end and one or two in the middle. In this way, two heads are processed for the price of one.

Moreover, with at least one lapping sensor (80) in the middle of the row of recording elements (82), the well known phenomenon of bowing in a tape head structure can be sensed. Once sensed, such bowing in the pair of heads, and more importantly in each separate head, can be corrected according to any known technique. In that regard, one such technique is discussed in U.S. Pat. No. 5,203,119 issued to Cole, which is hereby incorporated by reference. In that same regard, it should be noted that if the tape heads were processed singly, any bow would be greater due to the shorter "beam" length of the row of recording elements. Moreover, any such bow would remain as there is no room for a lapping sensor (80) in the center of a close packed multi-element tape head, and it would be difficult to bend the relatively shorter tape head (as compared to a pair of tape heads) during processing to correct for such bowing.

When any bow in the pair of heads is removed and all lapping sensors (80) generate an output close to the same throat height (h1), the throat height (h1) of each and every recording element (82) between the lapping sensors (80), to the first order, has a throat height (h1) that is between the values measured by the lapping sensors (80). It should be noted that second order effects, such as "S" waves, are smaller than the throat height tolerances required.

Figure 5:
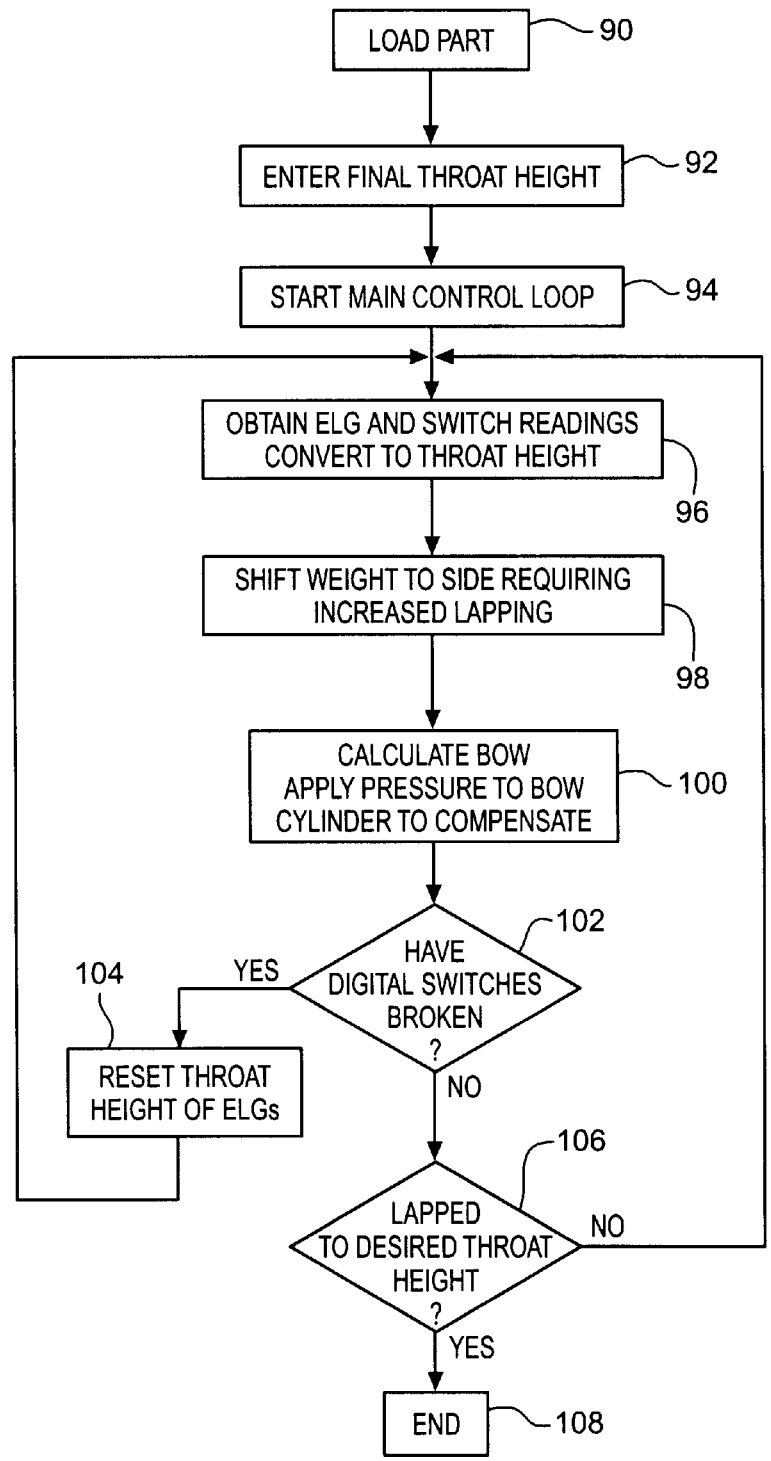
FIG. 5 is a flowchart of the lapping process for use in manufacturing the improved lapping sensor of the present invention.

In that regard, FIG. 5 is a flowchart of the lapping process for use in manufacturing the improved lapping sensor of the present invention. More specifically, FIG. 5 depicts the lapping process flow with analog electronic lapping guide (ELG) feedback and digital switches. As seen therein, a part is first loaded (90) for processing, and a final desired throat height is entered (92). Thereafter, a main control loop begins (94).

In the main control loop, ELG and switch readings are obtained (96) and converted to a throat height. Thereafter, the weight of the part is shifted (98) to the side requiring increased lapping, and the bow in the part is calculated and pressure is applied (100) to the bow cylinder to compensate, in any known fashion as previously described.

Next, it is determined if the digital switches have broken (102). If so, the throat height of the ELG is reset (104) and the main control loop is restarted. If not, it is determined if the lapping process has resulted in the desired throat height (106). If not, the main control loop is again restarted. If so, the lapping process is complete (108).

As is readily apparent from the foregoing description, then, the present invention provides an improved lapping sensor for measuring the throat height of a thin film recording element during the mechanical lapping process. More specifically, the present invention provides a lapping sensor which more accurately measures recording element throat height during the lapping process, and which can be fabricated during the same thin film photolithographic process steps used to fabricate the recording elements themselves. While described herein for use in conjunction with a write element, it should be noted that the present invention is not limited to use with write elements alone. In that regard, the improved lapping sensor of the present invention is suitable for use with any type or number of recording elements, such as coupled element magneto-resistive or giant magneto-resistive read elements.

It is to be understood, then, that the present invention has been described in a illustrative manner and that the terminology which has been used is intended to be in the nature of words of description rather than of limitation. As previously stated, many modification and variations of the present invention are possible in light of the above teachings. Therefore, it is also to be understood that, within the scope of the following claims, the present invention may be practiced otherwise than as specifically described.

What is claimed is:

1. A lapping sensor for measuring a throat height of a thin film recording element during a mechanical lapping process, the recording element being fabricated in a photolithographic process and having a zero throat location, the recording element having first and second magnetic poles separated by an insulating planar, the lapping sensor comprising:

a sensor device for generating an output signal indicative of the throat height during the lapping process, the sensor device being fabricated during the same photolithographic process as the recording element, the sensor device comprising a four wire lapping guide with a sensor element, wherein the sensor element comprises:
  top and bottom electrical contacts separated by a zero throat insulating layer defining an element height, the top contact being fabricated from a material layer used to fabricate the first magnetic pole of the recording element, the bottom contact being fabricated from a material layer used to fabricate the second magnetic pole of the recording element, the zero throat insulating layer being fabricated from a material layer used to fabricate the insulating planar of the recording element, the sensor element having a resistance value that increases as the element height decreases during the lapping process, the bottom contact being located a selected distance back from the zero throat location of the recording element;
  a calibration switch in electrical communication with the sensor device, the switch being fabricated during the same photolithographic process as the recording element and generating an output signal during the lapping process indicative of a low resistance value up to a selected distance from the zero throat location of the recording element, and indicative of a high resistance value thereafter, wherein the calibration switch comprises:
    a first electrical contact, the first contact having first and second sections, wherein the first contact is fabricated from a material layer used to fabricate the first magnetic pole of the recording element;
    a second electrical contact, the second contact having first and second sections, the first section of the second contact being provided in electrical contact with the first section of the first contact, wherein the second contact is fabricated from a material layer used to fabricate the second magnetic pole of the recording element; and
    an insulator interposed between the second sections of the first and second contacts, wherein the insulator is fabricated from a material layer used to fabricate the insulating planar of the recording element;
    wherein the lapping process removes the first sections of the first and second contacts such that an electrical current supplied between the first and second contacts is interrupted by the insulator;
  wherein a transition of the switch output signal from the low resistance value to the high resistance value during the lapping process is used to calibrate the sensor device output signal to the selected distance from the zero throat location of the recording element.

2. The lapping sensor of claim 1 wherein the selected distance from the zero throat location is approximately 5 µm.

3. A method for manufacturing a lapping sensor for measuring a throat height of a thin film recording element during a mechanical lapping process, the recording element being fabricated in a photolithographic process and having a zero throat location, the recording element having first and second magnetic poles separated by an insulating planar, the method comprising:
  fabricating a sensor device for generating an output signal indicative of the throat height during the lapping process, the sensor device being fabricated during the same photolithographic process as the recording element, wherein the sensor device comprises a four wire lapping guide with a sensor element, wherein fabricating the sensor device includes:
    depositing the sensor element having top and bottom electrical contacts separated by a zero throat insulating layer defining an element height, the top contact being fabricated from a material layer used to fabricate the first magnetic pole of the recording element, the bottom contact being fabricated from a material layer used to fabricate the second magnetic pole of the recording element, the zero throat insulating layer being fabricated from a material layer used to fabricate the insulating planar of the recording element, the sensor element having a resistance value that increases as the element height decreases during the lapping process, the bottom end of the sensor element being located a selected distance back from the zero throat location of the recording element;
  fabricating a calibration switch in electrical communication with the sensor device during the same photolithographic process as the recording element, the switch generating an output signal during the lapping process indicative of a low resistance value up to a selected distance from the zero throat location of the recording element, and indicative of a high resistance value thereafter, wherein fabricating a calibration switch comprises:
    depositing an electrically conductive material layer on a substrate to form a first electrical contact, the first contact having first and second sections, wherein the first contact is fabricated from a material layer used to fabricate the first magnetic pole of the recording element;
    depositing an insulator on the first and second sections of the first contact, wherein the insulator is fabricated from a material layer used to fabricate the insulating planar of the recording element;
    processing the insulator to expose the first section of the first contact; and
    depositing an electrically conductive material layer on the insulator and the first section of the first contact to form a second electrical contact, the second contact having a first section in electrical contact with the first section of the first contact and a second section insulated from the second section of the first contact by the insulator, wherein the second contact is fabricated from a material layer used to fabricate the second magnetic pole of the recording element;
    wherein the lapping process removes the first sections of the first and second contacts such that an electrical current supplied between the first and second contacts is interrupted by the insulator;
  wherein a transition of the switch output signal from the low resistance value to the high resistance value during the lapping process is used to calibrate the sensor device output signal to the selected distance from the zero throat location of the recording element.

4. The method of claim 3 wherein the selected distance from the zero throat location is approximately 5 µm.

5. A system for controlling throat heights of a plurality of thin film recording elements during a mechanical lapping process, the recording elements being fabricated in a photolithographic process and being disposed in a row having first and second ends, each recording element having first and second magnetic poles separated by an insulating planar, each recording element having a zero throat location, the system comprising:
  a first sensor device for providing an output signal indicative of the throat height during the lapping process, the first sensor device being disposed adjacent the first end of the row of recording elements;

a second sensor device for providing an output signal indicative of the throat height during the lapping process, the second sensor device being disposed adjacent the second end of the row of recording elements, wherein each of the first and second sensor devices is fabricated during the same photolithographic process as the recording element, wherein each of the first and second sensor devices comprises a four wire lapping guide with a sensor element, wherein the sensor element comprises:

top and bottom electrical contacts separated by a zero throat insulating layer defining an element height, the top contact being fabricated from a material layer used to fabricate the first magnetic pole of the recording element, the bottom contact being fabricated from a material layer used to fabricate the second magnetic pole of the recording element, the zero throat insulating layer being fabricated from a material layer used to fabricate the insulating planar of the recording element, the sensor element having a resistance value that increases as the element height decreases during the lapping process, the bottom end of the sensor element being located a selected distance back from the zero throat locations of the recording elements;

a first calibration switch in electrical communication with the first sensor device, the first switch being fabricated during the same photolithographic process as the recording elements and providing an output signal during the lapping process indicative of a low resistance value up to a selected distance from the zero throat locations of the recording elements, and indicative of a high resistance value thereafter;

a second calibration switch in electrical communication with the second sensor device, the second switch being fabricated during the same photolithographic process as the recording elements and providing an output signal during the lapping process indicative of a low resistance value up to a selected distance from the zero throat locations of the recording elements, and indicative of a high resistance value thereafter, wherein each of the first and second calibration switches comprises:

a first electrical contact, the first contact having first and second sections, wherein the first contact is fabricated from a material layer used to fabricate the first magnetic pole of the recording element;

a second electrical contact, the second contact having first and second sections, the first section of the second contact being provided in electrical contact with the first section of the first contact, wherein the second contact is fabricated from a material layer used to fabricate the second magnetic pole of the recording element; and an insulator interposed between the second sections of the first and second contacts, wherein the insulator is fabricated from a material layer used to fabricate the insulating planar of the recording element;

wherein the lapping process removes the first sections of the first and second contacts such that an electrical current supplied between the first and second contacts is interrupted by the insulator; and means for reducing a bow in the row of recording elements during the lapping process so that the first and second sensor devices and the first and second calibration switches provide a substantially accurate measure of the throat heights of each of the plurality of recording elements therebetween;

wherein a transition of the first and second switch output signals from the low resistance values to the high resistance values during the lapping process is used to calibrate the first and second sensor device output signals to the selected distance from the zero throat locations of the recording elements.

6. The system of claim 5 wherein the selected distance from the zero throat location is approximately 5 $\mu$m.

* * * * *